(12) United States Patent
Shiroor (10) Patent No.: US 9,035,972 B2
(45) Date of Patent: May 19, 2015

(54) INTELLIGENT AXIS LABELS

(75) Inventor: Kedar Shiroor, Mountain View, CA (US)

(73) Assignee: SAP SE, Walldorf (DE)

( * ) Notice: Subject to any disclaimer, the term of this patent is extended or adjusted under 35 U.S.C. 154(b) by 328 days.

(21) Appl. No.: 13/446,460

(22) Filed: Apr. 13, 2012

(65) Prior Publication Data

US 2013/0271493 A1    Oct. 17, 2013

(51) Int. Cl.
*G06T 11/20* (2006.01)
*G09G 5/00* (2006.01)

(52) U.S. Cl.
CPC .......... *G09G 5/00* (2013.01); *G09G 2340/0464* (2013.01); *G09G 2340/14* (2013.01)

(58) Field of Classification Search
None
See application file for complete search history.

(56) References Cited

U.S. PATENT DOCUMENTS

| | | | | |
|---|---|---|---|---|
| 5,414,838 | A * | 5/1995 | Kolton et al. | 705/36 R |
| 7,146,374 | B1 * | 12/2006 | Molesky | 1/1 |
| 2005/0162423 | A1 * | 7/2005 | Goggin | 345/440 |
| 2011/0227946 | A1 * | 9/2011 | Yoshizawa et al. | 345/636 |
| 2011/0305668 | A1 * | 12/2011 | Li et al. | 424/85.5 |

* cited by examiner

*Primary Examiner* — Xiao M. Wu
*Assistant Examiner* — Steven Elbinger
(74) *Attorney, Agent, or Firm* — Kenyon & Kenyon LLP (57) ABSTRACT

Labels to be displayed along an axis may be obtained as a sequence of labels. If it is determined that the labels in an original sequence of labels overlap, then an alternate sequence of labels that avoids the overlap of the labels may be determined. If it is determined that the labels in the original sequence of labels do not overlap, than the original sequence of labels may be displayed along the axis. If it is determined that the labels in the original sequence of labels overlap, then the alternate sequence of labels may be displayed.

21 Claims, 6 Drawing Sheets

FIG. 9 though, the
INTELLIGENT AXIS LABELS

BACKGROUND

To effectively convey information to a viewer via a display, the display needs to clearly and concisely present the information. Diagrams, graphs and charts can be used to more effectively display information to a viewer. To more clearly convey the information, labels are used on sides of the diagrams, graphs or charts to provide details about the information being displayed. Specifically, labels are used on axes of diagrams, graphs or charts to identify the information being displayed. These labels are an important component of data visualization.

Due to the type of data, amount of data and available space for the display, there is often times insufficient space on the display to effectively display all of the labels of the axes. In addition, labels are often too long to be displayed clearly in the available space next to the axes. To overcome these problems, techniques have been proposed that truncate the labels, reduce the size of the labels, change the orientation of the labels, or provide labels in multiple lines. However, all of these techniques are complex or take away from efficient and speedy data analysis. For example, it may be difficult to read labels on an X-axis that are displayed vertically or diagonally. Similarly, it may be difficult to quickly read adjacent labels that are displayed on multiple lines or labels with text that has been reduced in size. Furthermore, some of these techniques clutter the display because the labels are scattered in the available space on the display or require additional space outside or on the diagram, graph or chart that would otherwise be used to display the information being represented by the labels.

There is a need for techniques to simply display labels, while allowing the viewer to perform efficient and speedy data analysis.

DETAILED DESCRIPTION

Figure 1:
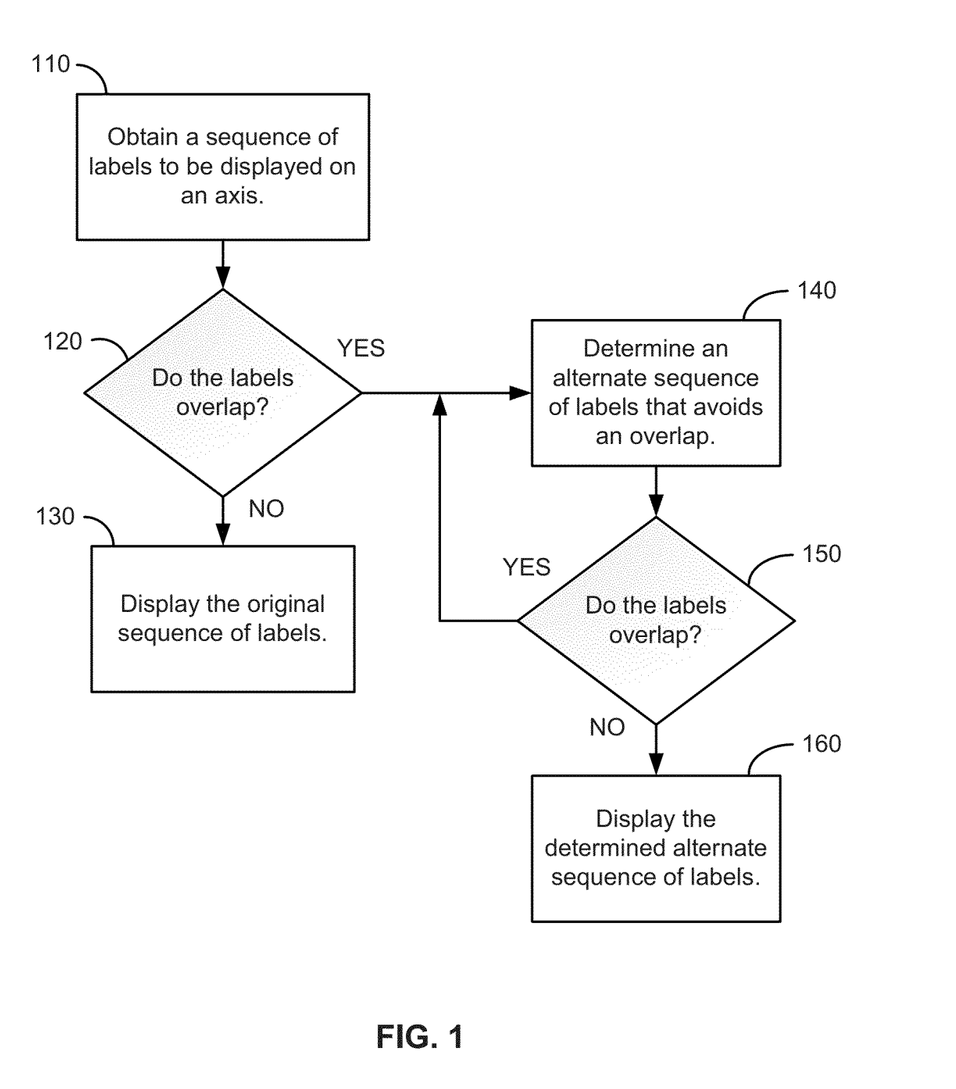
FIG. 1 shows a block diagram of an exemplary embodiment.

FIG. 1 shows a block diagram of an exemplary embodiment. The exemplary embodiment may include steps to determine whether a sequence of labels to be displayed along an axis can be displayed without the labels overlapping adjacent labels or whether an alternate sequence of labels should be used for displaying the labels to avoid overlap of the adjacent labels.

In the exemplary embodiment, a sequence of labels to be displayed is obtained in step 110. The labels may represent information that is being displayed or will be displayed on the diagram, graph or chart. The labels may include one or more of numbers, letters, symbols or a combination thereof. The labels may be obtained from the information that is to be displayed on the display device or from a source that is associated with the information that is to be displayed. The information that is to be displayed may be any information that can be displayed on a display with labels. The information that is to be displayed may be obtained from a storage device associated with the display device, from an external source or input by a user. The labels may also be generated by the display device or another external device from the data that is to be displayed on the display device.

The display device may include any one of a variety of displays such as an LCD device, a field emission display device, a plasma display panel, an organic light emitting display and other forms of displays. The displays may be employed on portable apparatuses, such as cellular phones, smart phones, personal digital assistants (PDA's) and tablets, or stationary apparatuses such as televisions, monitors and projectors.

The labels may be placed in the vicinity of an axis which is part of the diagram, graph or chart. Generally, labels can be placed on the X-axis, immediately below or above the X-axis, on the Y-axis, or to the left or right of the Y-axis. Although, the exemplary embodiments will be described with reference to displaying labels along the X-axis it is to be understood that the exemplary embodiments can be applied to labels along the Y-axis if the labels on the Y-axis are displayed vertically. Display of labels according to the exemplary embodiment may also include displaying labels along an axis on a multi dimensional diagraph, graph or chart displayed in three dimensions. Reference to placing the labels along the axis will be understood to include placing the labels on the axis, and to either side of the axis.

The display of the characters or symbols of each label may be restricted to displaying the characters or symbols along the axis in a single line. For example, if the characters or symbols are displayed along the X-axis, all of the characters or symbols of each label will be displayed in a single row. The characters or symbols may also be displayed in multiple rows. However, because displaying each label using multiple rows may clutter the display or make the display more difficult to easily read the label, it is better to use a lower number of rows to display the label and preferable to use a single line.

All of the labels that are determined to be displayed along the axis may be displayed in a single line along the axis. For example, all of the labels determined to be displayed may be displayed along the X-axis in a single row. The labels determined to be displayed may also be displayed in multiple rows, such that the labels are staggered or offset from each other. However, because staggering or offsetting the labels may clutter the display or make the display more difficult to read the label, it is preferable to display all of the labels along the axis in a single line.

In step 120 it can be determined whether the labels in the original sequence of labels overlap. The determination can be made by analyzing the placement of the labels along the axis with reference to the data that the labels represent in the diagram, graph or chart. The data that each label represents may be a data point, a bar, a bubble or any other symbol or combination of symbols on the diagram, graph or chart. The placement of each label along the axis with reference to the data that the label represents may include placing the same reference point of each label to the corresponding data. For example, the center of each label can be placed at the position that the label represents. Alternatively, the right side, left side or a predetermined point on each of the labels may be placed at the position that the label represents. The predetermined point on each label may be any reference point on the labels and may include a point that is a certain distance to the left or right of the center of the label or a position of certain character or symbol in the label.

The placement of each label along the axis with reference to the data that the labels represent, allows a determination to be made as to whether each label in the sequence overlaps the adjacent labels. Labels on the ends of the sequence of labels will have only one adjacent label. In making the determination whether adjacent labels overlap, additional space may be included between the labels to allow a viewer to easily distinguish between the labels that may otherwise be too close to each other.

Figure 2:
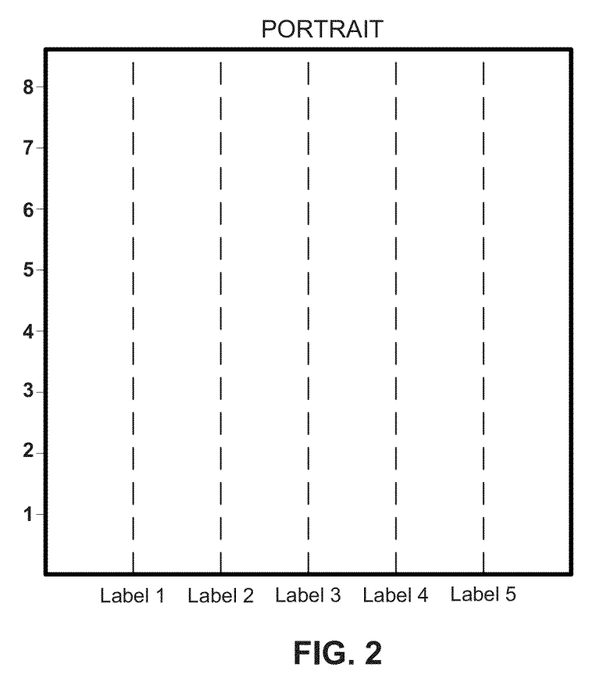
FIG. 2 shows an exemplary display of a sequence of labels that does not overlap in a portrait view of a diagram.
Figure 3:
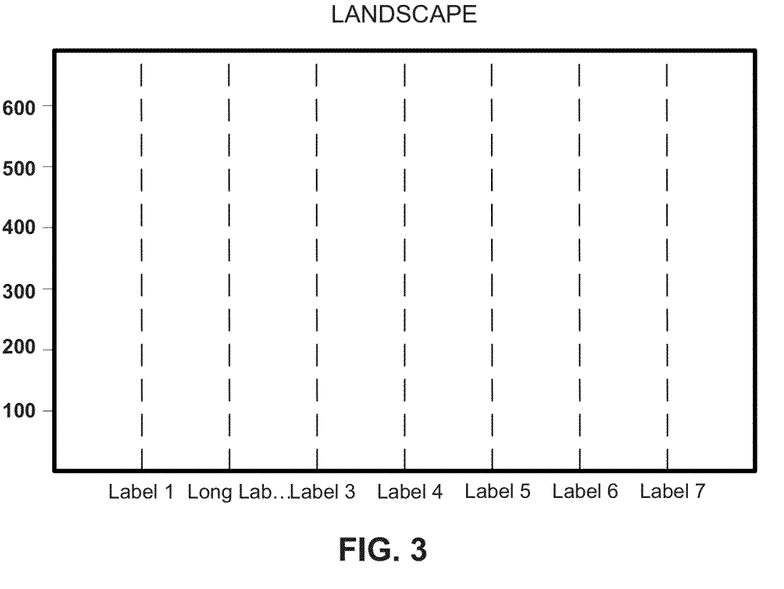
FIG. 3 shows an exemplary display of a sequence of labels that includes an overlapping label in a landscape view of a diagram.

FIG. 2 shows an exemplary display of a sequence of labels that does not overlap in a portrait view of a diagram. FIG. 3 shows an exemplary display of a sequence of labels that includes an overlapping label in a landscape view of a diagram. In FIG. 3, because "Long Label 2" overlaps with Label 3, "Long Label 2" is truncated. However, by truncating "Long Label 2" it is difficult to quickly determine what the second label represents and the labels in the vicinity of "Long Label 2" label become cluttered.

Figure 4:
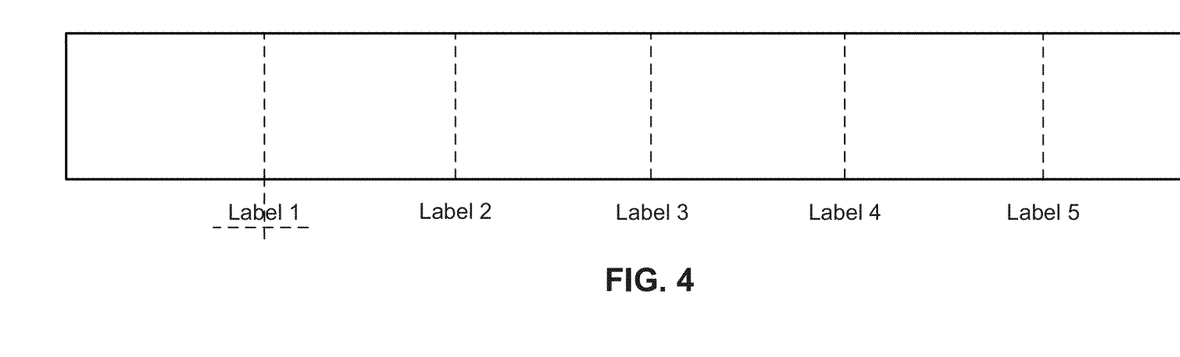
FIG. 4 shows an exemplary display of labels in a sequence that includes all of the labels in the display.

If the determination is made that no labels overlap in step 120, then in step 130 all of the labels in the original sequence of labels may be displayed along the axis. FIG. 4 shows an exemplary display of labels in a sequence that includes all of the labels in the display. Because none of the labels in FIG. 4 which are centered on the vertical line that the label represents overlap adjacent labels, all of the labels in the sequence may be displayed.

If in step 120 it is determined that the labels in the original sequence of labels overlap, then in step 140 it may be determined what kind of an alternate sequence of labels may be displayed that avoids an overlap of the labels. Alternate sequence of labels may include an arithmetic sequence, geometric sequence or any other sequence that avoids the overlap. Examples of alternate sequences include: "Label 1, Label 3, Label 5 . . . ;" "Label 1, Label 4, Label 7 . . . ;" "Label 1, Label 5, Label 10 . . . ;" and "Label 2, Label 4, Label 8, Label 16 . . . ".

Step 150 may be included to determine whether the labels in the determined alternate sequence of labels avoid the overlap of an adjacent label. Approach to determine whether the labels overlap discussed in step 120 may be applied in step 150. If in step 150 it is determined that the labels in the alternate sequence overlap then step 140 may be repeated to determine an alternate sequence of labels that avoids an overlap. If in step 150 it is determined that the labels in the alternate sequence do not overlap then step 150 may be performed to display the determined alternate sequence of labels.

Which alternate sequence should be used can be determined based on which labels overlap and which alternate sequence will avoid the overlap. For example, if each of the labels is about the same length and the labels only slightly overlap each of the adjacent labels then omitting every other label and using alternate sequence "Label 1, Label 3, Label 5 . . . ," may avoid the overlap. However, if the labels are of varying sizes and the overlap varies for the adjacent labels, alternate sequence "Label 2, Label 4, Label 8, Label 16 . . . " may be the alternate sequence that avoids the overlap.

To determine which alternate sequence avoids the overlap, one option is to test each alternate sequence in a predefined set of sequences until an alternate sequence is found that avoids the overlap. The predefined set of sequences may be arranged in an order such that more labels are removed from the alternate sequence. Another option is to determine which labels overlap and fit one of the predefined set of sequences. Other methods may include measuring parameters such as the amount of overlap, distance between data points on the graph, size of the labels and desired space between the labels to determine which alternate sequence of labels will avoid the overlap.

Figure 5:
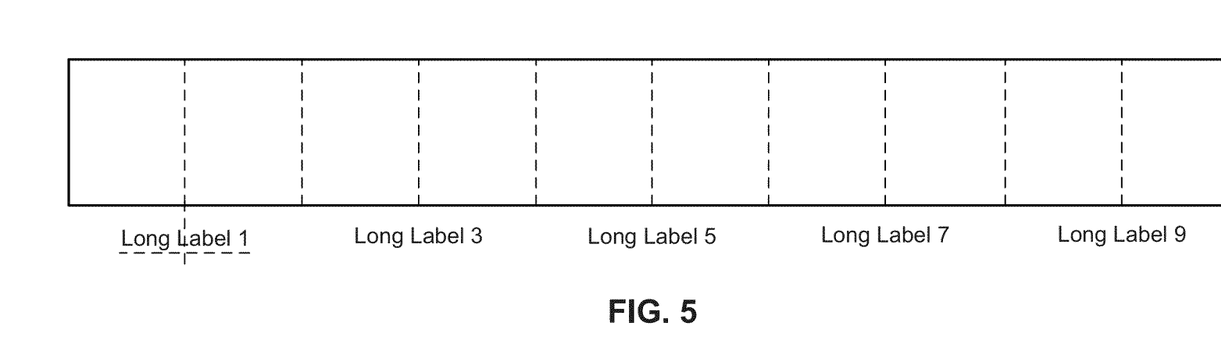
FIGS. 5 and 6 show exemplary displays of labels with alternate sequences of labels being displayed.
Figure 6:
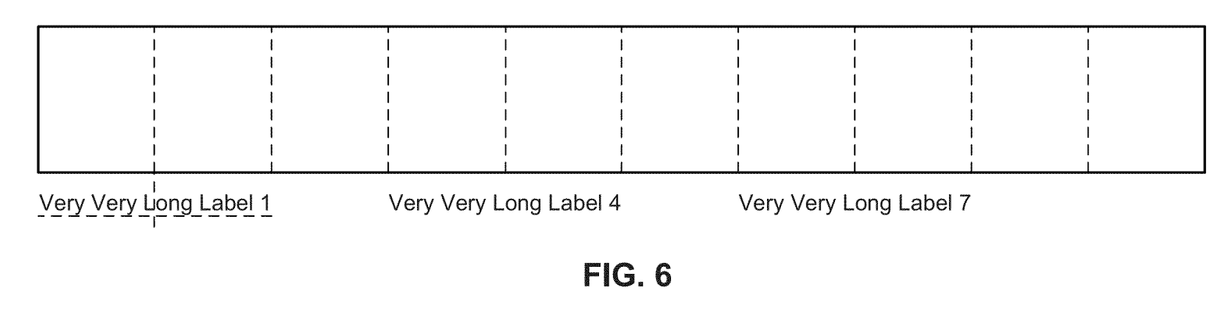

Once it is determined in steps 140 and 150 what kind of an alternate sequence avoids the overlap, the labels in the alternate sequence may be displayed in step 160. FIGS. 5 and 6 show exemplary displays of labels with alternate sequences of labels being displayed. FIG. 5 shows alternate sequence "Label 1, Label 3, Label 5 . . . " and FIG. 6 shows alternate sequence "Label 1, Label 4, Label 7 . . . ". The labels in FIGS. 5 and 6 are centered to the vertical line that the label represents.

Figure 7:
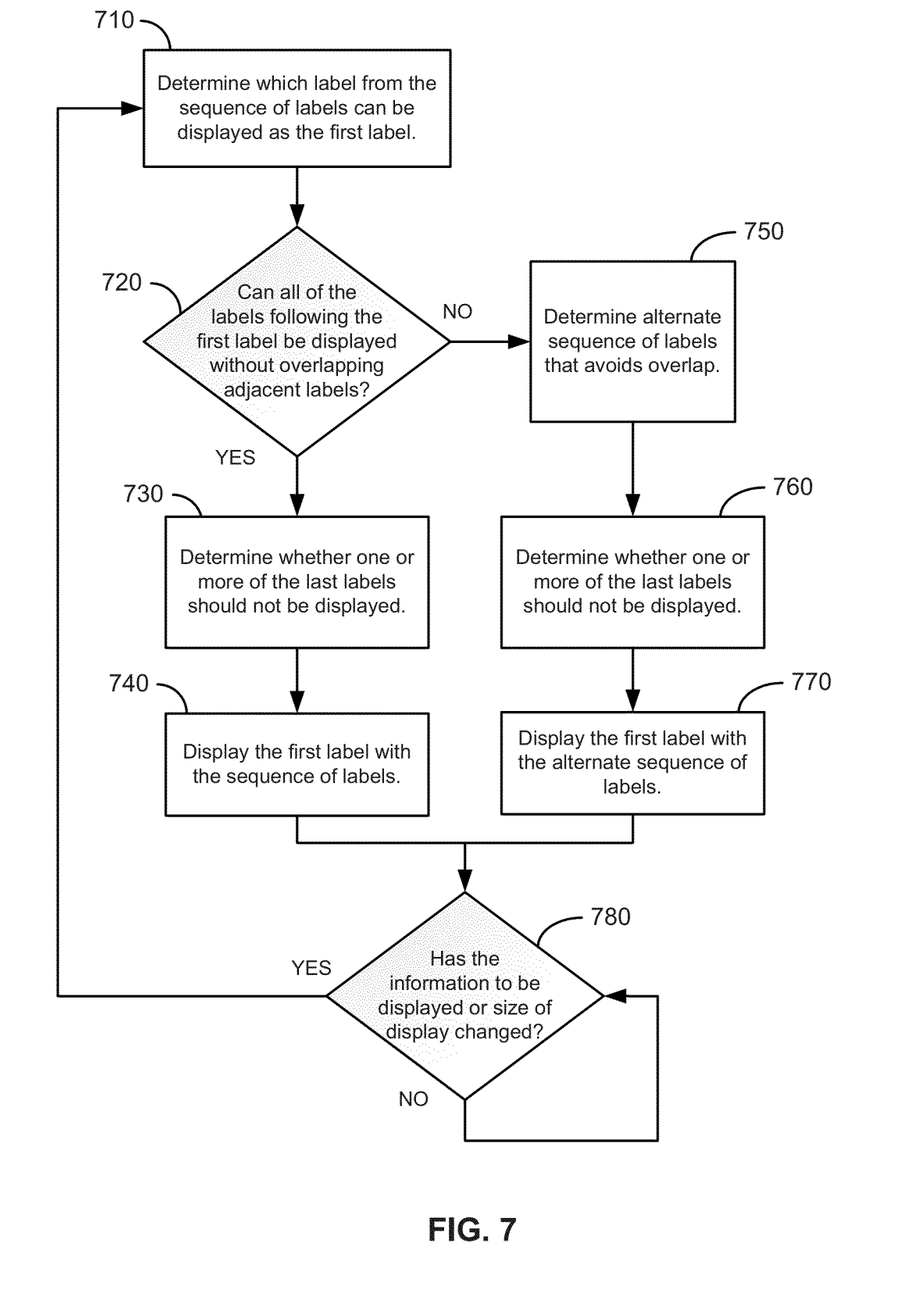
FIG. 7 shows a flow diagram of an exemplary method of the present invention.

FIG. 7 shows a flow diagram of an exemplary method of the present invention. The exemplary embodiment may be used in combination with other exemplary embodiments, such as the exemplary embodiment shown in FIG. 1. In step 710 a determination may be made as to which label from a sequence of labels can be displayed as the first label. The first label in the sequence of labels may not always be the label that should be displayed first along the axis. The first label in the sequence of labels may need more space than a space that is available for the first label. For example, if the labels are displayed on the X-axis and the labels are centered to the data that the label represents, due to the amount of text in the label the space needed for the first label may extend beyond the starting point of the X-axis. Therefore, to avoid displaying the first label in an area that extends beyond the bounds of the diagram, graph or chart, it may be beneficial to not display the first label in the displayed sequence of labels. In addition, it may be beneficial to not display more than one of the first labels in the sequence of labels if these labels do not fit within the available space on the diagram, graph or chart or go outside the bounds of the axis.

The determination as to which label from the sequence of labels can be displayed as the first label may be made by comparing the available space and the space needed for each of the labels aligned with the data point that the label represents. The comparison may be made one at a time for each of the labels in the sequence of labels until a label is found that is centered to the data that it represents and has enough space without extending beyond the bounds of the diagram, graph or chart. If the determination as to which label from the sequence of labels can be displayed as the first label determines that the first label in the sequence of labels can be displayed as the first label along the axis, then no other comparisons need to be made.

In step 720 it may be determined whether all of the labels in the original sequence of labels following the label that is determined to be displayed as the first label can be displayed without overlap.

If all of the labels in the original sequence of labels following the label that is determined to be displayed as the first label can be displayed without overlap, then in step 730 it may be determined whether one or more of the last labels to be displayed along the axis fit within the space that is available for the last labels. The determination may be made for each label, starting with the last label, by comparing the space needed to display the label and the available space for the label in the space that is aligned with the data that the label represents. The amount of available space may be the space that is available for the label without going outside the bounds of the axis or the diagram, graph or chart. If it is determined that the last label in the sequence of labels does not fit within the available space then it may be determined whether the next label will fit within the available space. The process may continue until it is determined which label can be displayed within the available space.

In step 740 the label that is determined to be displayed first and all of the labels following the label that is determined to be displayed first can be displayed along the axis. The display may omit displaying the one or more of the last labels that are determined to not fit within the available space.

If all of the labels in the sequence of labels following the label that is determined to be displayed as the first label can not be displayed without overlap, then in step 750 it may be determined which alternate sequence of labels can be used to display the labels following the label that is determined to be displayed first. The determination as to which alternate sequence of labels should be used may include the label to be displayed as the first label or may omit the label to be displayed as the first label from determining the alternate sequence of labels that should be displayed. Approach to determine an alternate sequence of labels discussed with respect to steps 140 and 150 in FIG. 1 may be applied in step 750.

In step 760 it may be determined whether one or more of the last labels to be displayed along the axis from the alternate sequence of labels fit within the space that is available for the last labels. The determination may be made for each label, starting with the last label in the alternate sequence, by comparing the space needed to display the label and the available space for the label in the space that is aligned with the data that the label represents. The amount of available space may be the space that is available for the label without going outside the bounds of the axis or the diagram, graph or chart. If it is determined that the last label in the alternate sequence of labels does not fit within the available space then it may be determined whether the next label in the alternate sequence will fit within the available space. The process may continue until it is determined which label can be displayed within the available space.

Figure 8:
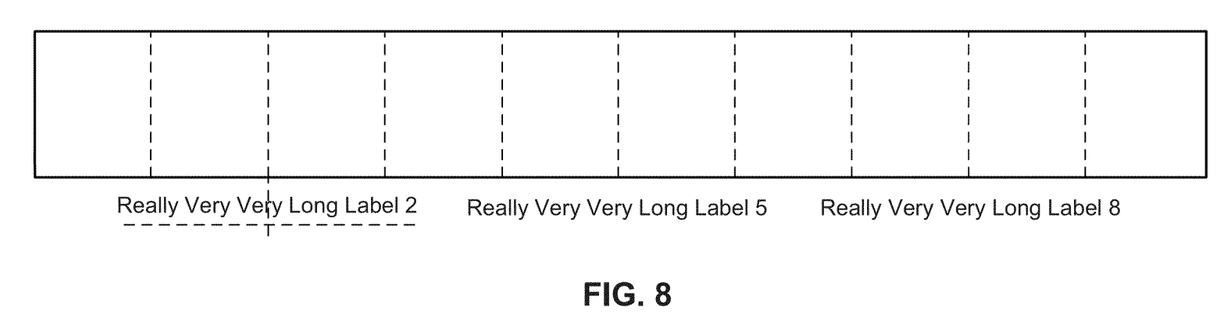
FIG. 8 shows an exemplary display of labels with an alternate sequence of labels being displayed.

In step 770 the label determined to be displayed first and the alternate sequence of the labels following the first label to be displayed may be displayed along the axis. FIG. 8 shows an exemplary display of labels with an alternate sequence of labels being displayed. In FIG. 8 the first label "Really Very Very Long Label 1" is omitted because such a label would extend beyond the bounds of the axis or diagram. However, label "Really Very Very Long Label 2" is displayed as the first label on the diagram because this is the first label in the sequence of labels that can be displayed without extending beyond the bounds of the axis or diagram. In addition, the sequence of "Label 2, Label 5, Label 8 . . . " is used to display the labels on the diagram because displaying all of the labels following label "Really Very Very Long Label 2" would cause at least labels "Really Very Very Long Label 3" and "Really Very Very Long Label 4" to overlap.

Steps 730 and 760 do not have to be performed immediately after steps 720 and 750, respectively. The determination as to which of the last labels should be omitted or not displayed along the axis may be made before or after determining which of the labels in the sequence of labels should be displayed first in step 710. The determination as to which of the last labels should be omitted or not displayed along the axis may also be performed after the sequences of labels have been displayed in steps 740 and 770 by removing the labels that should not be displayed.

The display of the labels may include indicia to indicate the location that each of the labels represents on the diagram, graph or chart. For example, as shown in FIGS. 5-6 and 8, the first label in each of the figures includes a cross shaped indicia under the label and going through the label to indicate the location on the diagram that the label represents. The indicia to indicate the location that each of the labels represents on the diagram may include a variety of marks such as lines, arrows, dots, squares or other symbols.

An exemplary embodiment may include step 780, in which it may be determined whether the information to be displayed or the size of the display changed. If information to be displayed has changed then some of the labels may need to be removed or added. Similarly, if the size of the display has changed the available space for the labels may increase or decrease. Thus, the labels already displayed may become cluttered or additional space may become available to display new labels. Change in the information to be displayed or change in the size of display may change the size of the axes available to display the labels.

The information to be displayed may be changed by the viewer inputting additional information, removing existing information, or requesting that more or less of the information be displayed on the diagram. The information to be displayed may also be changed by the system if instructions are received to add new data or remove existing data, or if information to be displayed is updated.

The change in the information to be displayed may also influence the size of display if the size of the diagram is linked to the amount of data or range of values being displayed. The size of the display may be changed by the user zooming in or out on the whole display, zooming in or out on the diagram, selecting a portion of the diagram already being displayed to be displayed, or changing the orientation of the display or diagram. The orientation of the display or diagram may be caused automatically by user operations such as rotating the display device.

If in step 780 it is determined that the information to be displayed or the size of the display changed, then the steps of the exemplary embodiment may be repeated to determine the sequence of labels that should be displayed. However, if no change is detected then the system may maintain the current display of the labels along the axis.

The above described embodiments may be an automated process to display the labels on the axes. The automated process does not require a viewer to manually select the desired view of the labels out of the available options. The automated process may update the display of the labels along the axis if the information to be displayed or the size of the display or axis changes.

The automated process allows for information to be clearly presented to the viewer without cluttering the display with unnecessary labels and presenting labels that are easy to read. Using the exemplary embodiments, the viewer can quickly review the diagram, graph or chart using the displayed labels and decide whether additional information is needed. If additional information is needed, the viewer can make changes to the diagram, graph or chart to display new information with a newly determined set of labels. For example, by zooming in on a portion of the diagram for which more information is desired, the labels to be displayed may be regenerated according to one of the above discussed embodiments to get rid of labels that do not fit the display and to display additional labels that previously may not have fit without overlapping. If a user wants to expand the view of the diagram, graph or chart, the labels can be regenerated to fit within the available space along the axis without overlapping adjacent labels according to the above discussed exemplary embodiments.

Figure 9:
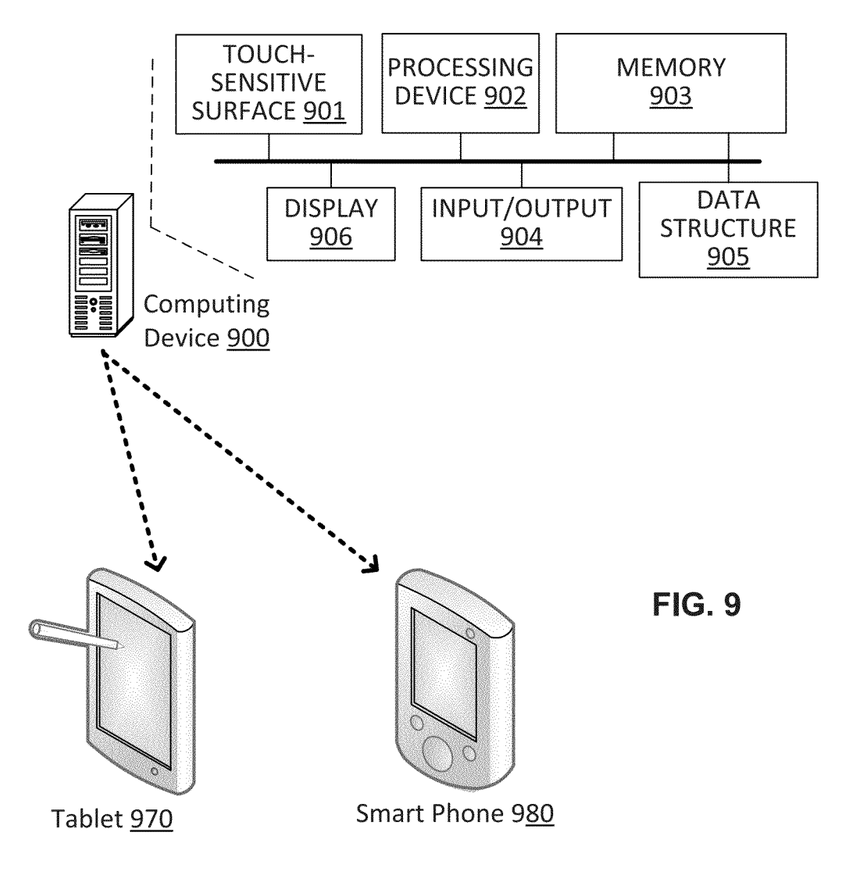
FIG. 9 shows an exemplary architecture of a computing device having a display device according to an exemplary embodiment.

FIG. 9 shows an exemplary architecture of a computing device 900 having a display device according to an exemplary embodiment. The computing device 900 may include a touch-sensitive surface 901, a processing device 902, a memory 903 storing structured data 905, an input/output device 904, and a display 906. Each of these components 901 to 906 may be interconnected via a system bus.

In some instances, a surface of the display 906 may be the touch-sensitive surface 901, though in other instances the two may be separate. Additionally, in some instances the computing device 900 may be a tablet 970, smart phone 980, or other type of portable computing device, though the computing device 700 need not be portable.

Communications input/output device 904 may enable connectivity between the computing device 900 and other computing systems, peripherals, and devices by encoding and/or transmitting data to be sent to the external devices and receiving and/or decoding data received from the external devices.

In an embodiment, memory 903 may contain different components for retrieving, presenting, changing, and saving data. Memory 903 may include a variety of memory devices, for example, Dynamic Random Access Memory (DRAM), Static RAM (SRAM), flash memory, cache memory, and other memory devices.

Processing device 902 may perform computation and control functions of a system and comprises a suitable central processing unit (CPU). Processing device 902 may include a single integrated circuit, such as a microprocessing device, or may include any suitable number of integrated circuit devices and/or circuit boards working in cooperation to accomplish the functions of a processing device. Processing device 902 may execute computer programs, such as object-oriented computer programs, within memory 903.

The foregoing description has been presented for purposes of illustration and description. It is not exhaustive and does not limit embodiments of the invention to the precise forms disclosed. Modifications and variations are possible in light of the above teachings or may be acquired from the practicing embodiments consistent with the invention. For example, some of the described embodiments may include software or hardware, but some systems and methods consistent with the present invention may be implemented in both software and hardware.

We claim:

1. A method for displaying labels on an axis, comprising:
   obtaining an original sequence of labels to be displayed along the axis;
   determining by a processor whether the labels in the original sequence of labels overlap an adjacent label in the original sequence of labels;
   if it is determined that the labels in the original sequence of labels overlap, determining an alternate sequence of labels that avoids the overlap, by successively testing predefined alternate sequences until whichever occurs first of the alternate sequence of labels that avoids the overlap being found and all the alternate sequences having been tested, wherein each alternate sequence is formed as a subset of the original sequence without changing a size of any of the individual labels in the original sequence;
   displaying the original sequence of labels if it is determined that the labels in the original sequence of labels do not overlap; and
   displaying the alternate sequence of labels that avoids the overlap if it is determined that the labels in the original sequence of labels overlap and the alternate sequence of labels that avoids the overlap is found.

2. The method of claim 1, further comprising:
   determining whether one of the labels in the sequence of labels that is to be displayed last along the axis and within a space that is aligned to an element that the label that is to be displayed last represents and that corresponds to a size of the label that is to be displayed last, extends past the bounds of the axis; and
   omitting the label that is to be displayed last from being displayed if it is determined that the label that is to be displayed last extends past the bounds of the axis.

3. The method of claim 1, wherein each of the labels is centered to an element that the label represents.

4. The method of claim 1, wherein characters in each label are displayed in a single line.

5. The method of claim 1, wherein at least one of the labels displayed along the axis includes an indicia to indicate a location on the axis that the label having the indicia represents.

6. The method of claim 1, wherein the steps to determine whether the original sequence of labels overlap, to determine an alternate sequence of labels that avoids the overlap, and to display the original sequence of labels or the alternate sequence of labels are repeated if it is determined that the display of information corresponding to the labels has changed.

7. The method of claim 1, wherein the testing includes selecting each alternate sequence from a plurality of predefined alternate sequences in which select labels are omitted, and wherein the alternate sequences differ in regard to which labels are omitted.

8. The method of claim 7, wherein at least some of the alternate sequences omit labels according to a geometric sequence.

9. The method of claim 1, further comprising:
   forming the alternate sequences by selecting labels from the original sequence based on different predefined patterns, such that a first alternate sequence and a second alternate sequence share the same number of labels, but differ with respect to which individual labels are selected.

10. A method for displaying labels along an axis from an original sequence of labels, comprising:
    identifying by a processor a first label from the original sequence of labels that can be displayed along the axis within a space that is aligned to an element that the first label represents, that corresponds to a size of the first label, and does not extend past the bounds of the axis;
    after identifying the first label, determining whether labels in the original sequence of labels following the first label overlap an adjacent label in the sequence of labels;
    if it is determined that the labels in the original sequence of labels following the first label overlap, determining an alternate sequence of the labels following the first label that avoids the overlap, by successively testing predefined alternate sequences of the labels following the first label until whichever occurs first of the alternate sequence of the labels following the first label that avoids the overlap being found and all the alternate sequences having been tested, wherein each alternate sequence is formed as a subset of the original sequence without changing a size of any of the individual labels in the original sequence;

displaying the first label and the original sequence of labels following the first label if it is determined that the labels in the original sequence of labels following the first label do not overlap; and displaying the first label and the alternate sequence of labels following the first label if it is determined that the labels in the original sequence following the first label overlap and the alternate sequence of the labels following the first label that avoids the overlap is found.

11. The method of claim 10, further comprising:

determining whether one of the labels in the sequence of labels that is to be displayed last along the axis and within a space that is aligned to an element that the label that is to be displayed last represents and that corresponds to a size of the label that is to be displayed last, extends past the bounds of the axis; and omitting the label that is to be displayed last from being displayed if it is determined that the label that is to be displayed last extends past the bounds of the axis.

12. The method of claim 10, wherein the first label is displayed within the space that is centered to the element that the first label represents.

13. The method of claim 10, wherein at least one of the labels displayed along the axis includes an indicia to indicate a location on the axis that the label having the indicia represents.

14. The method of claim 10, wherein the steps to identify the first label to be displayed, to determine whether the original sequence of labels overlap, to determine an alternate sequence of labels that avoids the overlap, and to display the original sequence of labels or the alternate sequence of labels are repeated if it is determined that the display of information corresponding to the labels has changed.

15. The method of claim 10, wherein the testing includes selecting each alternate sequence from a plurality of predefined alternate sequences in which select labels are omitted, and wherein the alternate sequences differ in regard to which labels are omitted.

16. The method of claim 10, wherein the step of identifying a first label includes:

iteratively determining, by stepping through an original sequence of labels one label at a time, whether a candidate label from the original sequence of labels meets the following criteria:

can be displayed along the axis within a space that is aligned to an element that the candidate label represents, corresponds to a size of the candidate label, and does not extend past the bounds of the axis;

wherein the iterative determining is performed until a candidate label that meets all the criteria is found, whereupon the candidate label meeting all the criteria is identified as the first label.

17. A non-transitory computer readable medium comprising a set of stored instructions that, when executed by a processing device, cause the processing device to:

obtain an original sequence of labels to be displayed along an axis;

determine whether the labels in the original sequence of labels overlap an adjacent label in the original sequence of labels;

if it is determined that the labels in the original sequence of labels overlap, determine an alternate sequence of labels that avoids the overlap, by successively testing predefined alternate sequences until whichever occurs first of the alternate sequence of labels that avoids the overlap being found and all the alternate sequences having been tested, wherein each alternate sequence is formed as a subset of the original sequence without changing a size of any of the individual labels in the original sequence;

display the original sequence of labels if it is determined that the labels in the original sequence of labels do not overlap; and display the alternate sequence of labels if it is determined that the labels in the original sequence of labels overlap and the alternate sequence of labels that avoids the overlap is found.

18. An apparatus for displaying information, comprising a processing unit; and a display screen operatively connected to the processing unit and operative to display the information in a format including a sequence of labels corresponding to the information to be displayed on the display screen, wherein the processing unit is operative to;

obtain an original sequence of labels;

determine whether the labels in the original sequence of labels overlap an adjacent label in the original sequence of labels;

if it is determined that the labels in the original sequence of labels overlap, determine an alternate sequence of labels that avoids the overlap, by successively testing predefined alternate sequences until whichever occurs first of the alternate sequence of labels that avoids the overlap being found and all the alternate sequences having been tested, wherein each alternate sequence is formed as a subset of the original sequence without changing a size of any of the individual labels in the original sequence;

display on the display screen the original sequence of labels if it is determined that the labels in the original sequence of labels do not overlap; and display on the display screen the alternate sequence of labels if it is determined that the labels in the original sequence of labels overlap and the alternate sequence of labels that avoids the overlap is found.

19. The apparatus of claim 18 wherein the processing unit is operative to display the labels on the display screen in a single line.

20. The apparatus of claim 18 wherein the processing unit is operative to display the characters in each label in a single line.

21. The apparatus of claim 18 wherein the processing unit is operative to display on the display screen an axis along which the labels are disposed.

* * * * *